(12) United States Patent
Lyu et al.

(10) Patent No.: US 12,347,310 B2
(45) Date of Patent: Jul. 1, 2025

(54) METHOD FOR SHORT-TERM TRAFFIC RISK PREDICTION OF ROAD SECTIONS USING ROADSIDE OBSERVATION DATA

(71) Applicant: Wuhan University of Technology, Wuhan (CN)

(72) Inventors: Nengchao Lyu, Wuhan (CN); Jiaqiang Wen, Wuhan (CN); Lingfeng Peng, Wuhan (CN); Wei Hao, Wuhan (CN); Haoran Wu, Wuhan (CN); Yugang Wang, Wuhan (CN)

(73) Assignee: WUHAN UNIVERSITY OF TECHNOLOGY, Wuhan (CN)

( * ) Notice: Subject to any disclaimer, the term of this patent is extended or adjusted under 35 U.S.C. 154(b) by 965 days.

(21) Appl. No.: 17/471,212

(22) Filed: Sep. 10, 2021

(65) Prior Publication Data
US 2022/0383738 A1 Dec. 1, 2022

(30) Foreign Application Priority Data
May 24, 2021 (CN) .......................... 202110562845.X

(51) Int. Cl.
*G08G 1/01* (2006.01)
*G06F 18/2411* (2023.01)
(Continued)

(52) U.S. Cl.
CPC ....... *G08G 1/0145* (2013.01); *G06F 18/2411* (2023.01); *G06F 18/24147* (2023.01);
(Continued)

(58) Field of Classification Search
CPC .... G08G 1/0145; G08G 1/0116; G08G 1/052; G08G 1/166; G08G 1/0133;
(Continued)

(56) References Cited

U.S. PATENT DOCUMENTS

| 2013/0325306 | A1* | 12/2013 | Caveney | ........... | B60W 30/0953 |
| | | | | | 701/117 |
| 2016/0103218 | A1* | 4/2016 | Mandava | ............... | B60Q 5/006 |
| | | | | | 701/301 |

(Continued)

OTHER PUBLICATIONS

Datondji, 'A Survey of Vision-Based Traffic Monitoring of Road Intersections', IEEE Transactions on Intelligent Transportation Systems, vol. 17, No. 10, Oct. 2016 (Year: 2016).*

*Primary Examiner* — Kenny Nguyen
(74) *Attorney, Agent, or Firm* — WPAT, PC

(57) ABSTRACT

Disclosed is a method for short-term traffic risk prediction of road sections by using roadside observation data. The method includes the following steps: 1) vehicle trajectory data in the detection area is obtained by using roadside observation data; 2) according to the continuous driving trajectories in the detection area, the traffic flow indicators are counted, and the surrogate safety indicators between vehicles are calculated; 3) time to collision and deceleration are selected as identification indicators to identify conflict events with collision risk in the detection area; 4) traffic flow indicators and surrogate safety indicators within the set time before the occurrence of conflict events are extracted, and the feature screening of various extracted indicators is performed by using classification algorithms; 5) based on the selected feature indicators, the indicators with the highest importance ranking are selected as the input to build a short-term traffic risk prediction model, and the model training and testing are completed by using the identified conflict events; 6) the short-term traffic risk prediction model is used to predict the risk of road sections. The proposed method can improve the prediction accuracy rate of road sections.

9 Claims, 2 Drawing Sheets

(51) Int. Cl.
*G06F 18/2413* (2023.01)
*G08G 1/052* (2006.01)
*G08G 1/16* (2006.01)

(52) U.S. Cl.
CPC .......... *G08G 1/0116* (2013.01); *G08G 1/052* (2013.01); *G08G 1/166* (2013.01)

(58) Field of Classification Search
CPC .... G08G 1/0112; G08G 1/0125; G08G 1/042; G08G 1/065; G08G 1/164; G06F 18/2411; G06F 18/24147; G06V 20/54
USPC .......................................................... 701/329
See application file for complete search history.

(56) References Cited

U.S. PATENT DOCUMENTS

| | | | |
|---|---|---|---|
| 2017/0268896 A1* | 9/2017 | Bai ..................... | G01C 21/3484 |
| 2017/0344855 A1* | 11/2017 | Mande ................... | G06V 20/58 |
| 2020/0231149 A1* | 7/2020 | Eggert ................... | G08G 1/166 |
| 2021/0089938 A1* | 3/2021 | Ariannezhad .... | G08G 1/096775 |
| 2021/0217307 A1* | 7/2021 | Abdel-Aty ........... | G08G 1/0116 |
| 2021/0394797 A1* | 12/2021 | Ran ..................... | G08G 1/0112 |
| 2022/0219731 A1* | 7/2022 | Ran ..................... | G06V 20/597 |

* cited by examiner

METHOD FOR SHORT-TERM TRAFFIC RISK PREDICTION OF ROAD SECTIONS USING ROADSIDE OBSERVATION DATA

APPLICATIONS

This application claims priority from Chinese Patent Application No. 202110562845X, filed on May 24, 2021, the contents of which are hereby incorporated by reference in their entirety for all purposes.

TECHNICAL FIELD

The field of the invention relates to intelligent transportation technology, and more particularly to a method for short-term traffic risk prediction of road sections by using roadside observation data.

BACKGROUND

With the rapid development of road traffic construction, the number of car ownership continues to grow. Road traffic accidents are one of the important factors causing casualties in China, and the road traffic safety situation remains severe. How to reduce road traffic risks and improve the safety level of road sections is an important research content of traffic safety management.

Under the application of Intelligent Transportation System (ITS) and Advanced Traffic Management System (ATMS), it has become a new idea to use real-time traffic flow information of road sections to predict the possibility of collision accidents within a short time window. In particular, the research on the Real-Time Crash Prediction Model (RTCPM) plays a positive role in helping the traffic control department to identify the traffic state of the road section in time and take measures to reduce the risk of accidents.

The current real-time crash prediction model research mainly establishes the relationship between historical accident data or traffic flow data and collision risk, so as to realize the short-term traffic risk prediction of a certain road section. However, it only uses conventional traffic flow parameters, such as flow, occupancy, and speed. It does not consider the driving behavior of individual vehicles and the interaction behavior of vehicle groups that are closely related to the collision. The prediction accuracy of road collision risk is still insufficient. Therefore, based on the macroscopic traffic flow characteristics and microscopic vehicle driving behavior of the road sections, a short-term traffic risk prediction method for road sections that integrates traditional traffic flow parameters and typical surrogate safety indicators is proposed, which is of great significance for enhancing traffic control and improving driving level on special road sections.

SUMMARY

The terms "invention", "the invention", "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

S1. The vehicle trajectory data in the detection area is obtained with the support of roadside observation data;

The basic information of vehicles in the detection area is collected at a fixed frequency by roadside microwave radar (or other detection equipment); the detection area is mainly the longitudinal sensing range of the microwave radar; the basic information includes time stamp, vehicle ID, vehicle location, and speed;

Based on the basic information of the vehicles stored in the radar records, the position information and speed information of the vehicle are extracted frame by frame according to the vehicle ID, and the trajectory data of each vehicle in the detection area is obtained;

S2. According to the continuous driving trajectory data in the detection area, the traffic flow indicators are counted and the surrogate safety indicators between vehicles are calculated; the surrogate safety indicators include: deceleration, distance headway, time headway, time to collision, modified time to collision, and stopping distance;

Traffic flow indicators include: traffic flow, occupancy rate, vehicle speed, as well as congestion index and the number of lane changes;

S3. Time to collision and deceleration are selected as identification indicators to identify conflict events with collision risk in the detection area;

S4. The traditional traffic flow indicators and typical surrogate safety indicators within the set time before the occurrence of conflict events are extracted, and the feature screening of various extracted indicators is performed by using classification algorithms;

S5. Based on the selected feature indicators, the indicators with the highest importance ranking are selected as the input to build a short-term traffic risk prediction model, and the model training and testing are completed by using the existing data;

According to the screening results of feature indicators, the first M feature indicators ranked by importance are selected as input, and a short-term traffic risk prediction model based on support vector machines is constructed.

S6. Based on the constructed short-term traffic risk prediction model, the selected feature indicators are used as input to perform risk prediction of road sections.

The beneficial effect produced by the present invention is that: when establishing a road section traffic risk prediction model, the present invention also considers the driving behavior of the individual vehicle and the interaction behavior of the vehicle group, so that the accuracy of the model is higher.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

DETAILED DESCRIPTION

In order to make the objectives, technical solutions, and advantages of the present invention clearer, the present invention will be further described in detail below in conjunction with embodiments. It should be understood that the specific embodiments described here are only used to explain the present invention, but not used to limit the present invention.

The following describes technical solutions of this application with reference to the accompanying drawings.

Figure 1:
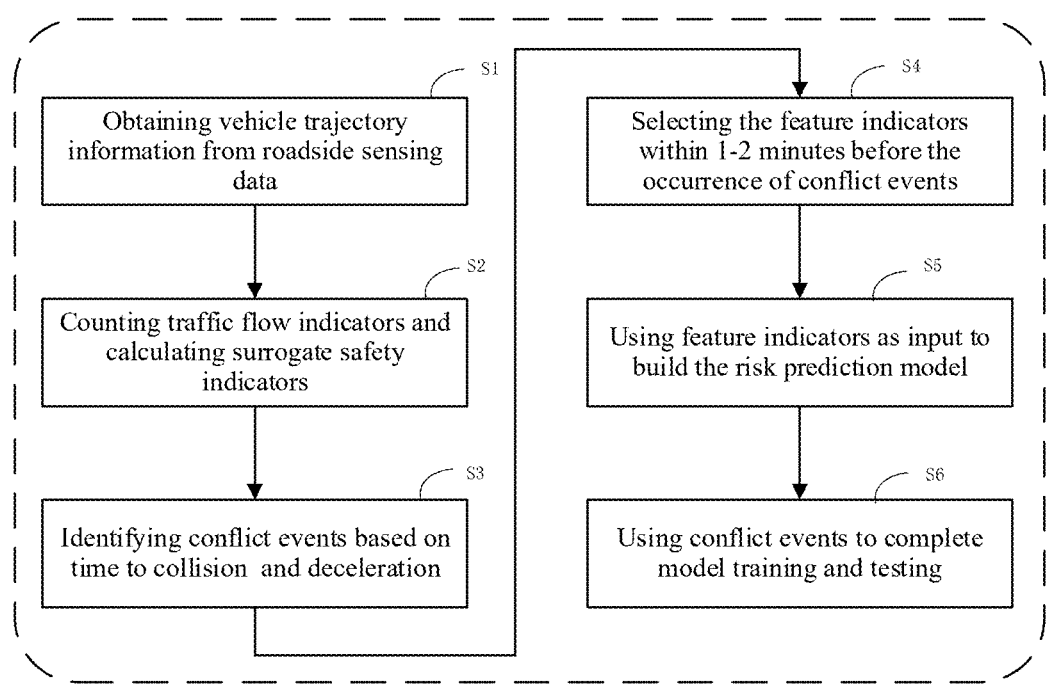
FIG. 1 is a flowchart of a method according to an embodiment of the present invention.

As shown in FIG. 1, a method for short-term traffic risk prediction of road sections using roadside observation data includes the following steps:

S1: The trajectory data of vehicles in the detection area is obtained by using the roadside observation data;

The basic information of vehicles in the detection area is collected at a fixed frequency by roadside microwave radar or other detection equipment; the detection area mainly refers to the longitudinal sensing range of the microwave radar; the basic information includes a timestamp, vehicle ID, vehicle position and speed;

The fixed acquisition frequency is generally set to 1 second/frame, which can be changed as required; the detection area is the longitudinal sensing range of the microwave radar, generally 150 m~200 m;

Based on the basic information of the vehicles stored in the radar records, the position information and speed information of the vehicles are extracted frame by frame according to the vehicle ID, and the trajectory data of each vehicle in the detection area is obtained;

$$\text{Trajectory}_{it} = \{x_i, y_i, v_i, t, ID\}$$

among them:
Trajectory$_{it}$ represents the trajectory data of vehicle i at time t;
$x_i$, $y_i$ represent the location information of vehicle i;
$v_i$ represents the speed information of vehicle i;
ID represents the identification code information of vehicle i;

The missing or interrupted trajectory data is processed by adopting the trajectory association of the nearest neighbor algorithm; A smooth vehicle trajectory is obtained by using the moving mean filtering method;

To supplement the missing trajectory data, the formula is as follows:

$$\text{if } \{(x_i, y_i, v_i) \mid t = t_0\} = \emptyset,$$
$$\begin{cases} x_i = x_i(t_0 + \Delta t) \\ y_i = y_i(t_0 + \Delta t) \\ v_i = v_i(t_0 + \Delta t) \end{cases}$$

The mean filtering is performed on the trajectory data, and the formula is as follows:

$$\begin{cases} \overline{x_i(t)} = [x_i(t - \Delta t) + x_i(t) + x_i(t + \Delta t)]/3 \\ \overline{y_i(t)} = [y_i(t - \Delta t) + y_i(t) + y_i(t + \Delta t)]/3 \\ \hat{v}_i = [v_i(t - \Delta t) + v_i(t) + v_i(t + \Delta t)]/3 \end{cases}$$

among them:
$\Delta t$ represents the time interval of recording trajectory data,
$\overline{x_i(t)}$, $\overline{y_i(t)}$ represents the position information of vehicle i after filtering,
$\hat{v}_i$ represents the speed information of vehicle i after filtering processing;

S2: According to the continuous driving trajectory data in the detection area, the traffic flow indicators are counted and the surrogate safety indicators between vehicles are calculated; the surrogate safety indicators include: deceleration, distance headway, time headway, time to collision, modified time to collision, and stopping distance;

Traffic flow indicators include: traffic flow, occupancy rate, vehicle speed, as well as congestion index and the number of lane changes;

S3: Time to collision and deceleration are selected as identification indicators to identify conflict events with collision risk in the detection area;

According to the calculated multiple surrogate safety indicators, the time to collision and deceleration are selected as the distinguishing indicators, combined with 'logic and' criteria, to identify the conflict events with collision risk in the detection area. Time to collision and deceleration are indicators used to calibrate Near-Crash Events. The 'logic and' criterion requires that when both the time to collision and deceleration indicators meet the threshold requirements, the event will be recognized as a conflict event;

$$\text{Event} = \begin{cases} 1, & TTC < ttc \text{ and } Decal < a_{1\%} \\ 0, & \text{else} \end{cases}$$

Figure 2:
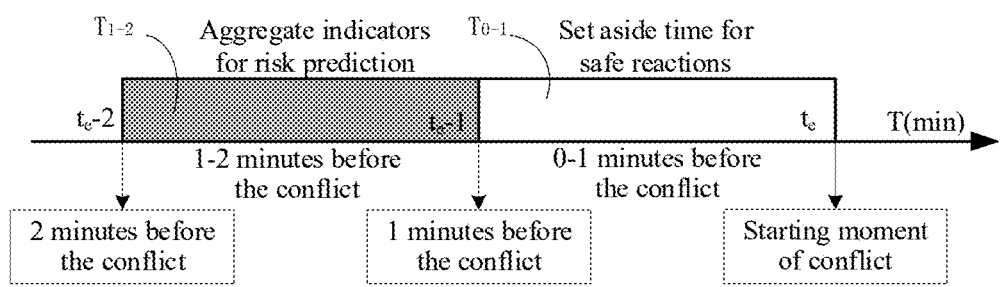
FIG. 2 is a schematic diagram of data aggregation time points in an embodiment of the present invention.

Among them, Event takes 1 to indicate that the event is a conflict event, and Event takes 0 to indicate that the event is a non-conflict event;
TTC and Decel respectively represent the time to collision and deceleration value,
ttc represents the critical threshold of time to collision,
$a_1\%$ represents the 1% quantile of the statistical deceleration;

S4: Traditional traffic flow indicators and typical surrogate safety indicators within a set time before the occurrence of conflict events are extracted, and feature screening on various indicators is performed by using classification algorithms;

As shown in FIG. 2, for conflicts that have been identified, based on the timestamp, the traditional traffic flow indicators and typical surrogate safety indicators within 1 to 2 minutes before the occurrence of each conflict event $T_{1-2}$ are extracted. These various indicators are used for collision risk prediction modeling through data aggregation. The 0 to 1 minute period before the occurrence of the conflict $T_{0-1}$ is the response stage of safety measures after the collision risk prediction.

For the traditional traffic flow indicators and typical surrogate safety indicators within 1-2 minutes before the occurrence of the conflict, the data aggregation method is used to obtain the aggregated value of each indicator;

The data aggregation method is to calculate the average value of a certain indicator of all targets in the detection area in 1 second, and then aggregate the average value over a time segment length of 1 minute. The data aggregation formula is as follows:

$$\text{Indicator} = \left[ \sum_{t}^{t+T} \left( \frac{\sum_{n=1}^{N} p_{t,n}}{N} \right) \right] * \frac{1}{T}$$

Among them, Indicator represents the type of aggregated indicators,

T represents the length of time for aggregation, which is 1 minute, t represents the starting point of data aggregation, that is, 2 minutes before the occurrence of the conflict event, N represents the total number of aggregated indicators of a certain type, $p_{t,n}$ represents the nth value of a certain type of indicator;

Based on the aggregation values of various traffic flow indicators and surrogate safety indicators, according to the contribution of various indicators to collision risk prediction, the random forest classification algorithm is used to sort the importance of various indicators to complete the screening of feature indicators.

In this embodiment, the indicator ranked in the top 90% of importance can be selected;

S5: Based on the sorting of feature indicators, according to actual needs, the indicators are selected as input to build a short-term traffic risk prediction model, and the identified conflict events are used to complete the training and testing of the model;

According to the screening results of feature indicators, the first M feature indicators ranked by importance are selected as input, and a short-term traffic risk prediction model based on support vector machines is constructed.

The identified conflict events are randomly divided into a training set and a test set according to a certain proportion. The training set is used to train the constructed short-term traffic risk prediction model, and the test set is used to verify the prediction effect of the short-term traffic risk prediction model.

S6: Based on the constructed short-term traffic risk prediction model, the screening results of feature indicators of a certain section are used as input to perform risk prediction.

That which is claimed is:

1. A method for short-term traffic risk prediction of road sections using roadside observation data, including the following steps:

1) a vehicle trajectory of each vehicle in a detection area is obtained by the roadside observation data;

basic information of vehicles in the detection area is collected by roadside detection equipment; the basic information includes a timestamp, vehicle ID, vehicle position and speed;

based on the basic information of the vehicles stored in radar, position information and speed information of the vehicles are extracted frame by frame according to the vehicle ID, and finally the vehicle trajectory of each vehicle in the detection area is obtained;

2) according to the vehicle trajectory of each vehicle in the detection area, traffic flow indicators are counted and surrogate safety indicators between vehicles are calculated; the surrogate safety indicators include: deceleration, distance headway, time headway, time to collision, modified time to collision, and stopping distance;

the traffic flow indicators include: traffic flow, occupancy rate, vehicle speed, congestion index and a number of lane changes;

3) the time to collision and the deceleration are selected as identification indicators to identify conflict events with collision risk in the detection area;

4) traffic flow indicators and surrogate safety indicators within a set time before occurrence of the identified conflict events are extracted, and classification algorithms are used to perform feature screening on the extracted traffic flow indicators and surrogate safety indicators;

5) based on selected feature indicators, the selected feature indicators with a highest importance ranking are selected as input to construct a short-term traffic risk prediction model, and the identified conflict events are used to complete the model training and testing;

6) With the support of the constructed short-term traffic risk prediction model, the selected feature indicators are selected as input to predict a traffic risk configured for traffic safety control.

2. The method for short-term traffic risk prediction of road sections using roadside observation data according to claim 1, wherein the detection area in step 1) is set according to longitudinal sensing range of the roadside detection device.

3. The method for short-term traffic risk prediction of road sections using roadside observation data according to claim 1, in step 1), position information and speed information of the vehicle are extracted frame by frame according to the vehicle ID, and finally the vehicle trajectory of each vehicle in the detection area is obtained, as follows:

based on the basic information of the vehicle, position information and speed information of the vehicle are extracted frame by frame according to the vehicle ID, and the vehicle trajectory data of each vehicle in the detection area is obtained; the expression is as follows:

$$\text{Trajectory}_{it} = \{x_i, y_i, v_i, t, ID\}$$

among them:

Trajectory$_{it}$ represents the trajectory data of vehicle i at time t;

$x_i$, $y_i$ represent the location information of vehicle i;

$v_i$ represents the speed information of vehicle i;

ID represents the identification code information of vehicle i;

the trajectory association of the nearest neighbor algorithm is adopted to deal with missing or interrupted trajectory data; the moving mean filtering method is used to obtain a smooth vehicle trajectory.

4. The method for short-term traffic risk prediction of road sections using roadside observation data according to claim 3, the trajectory association of the nearest neighbor algorithm is adopted to deal with missing or interrupted trajectory data; to supplement the missing trajectory data, the formula is as follows:

$$\text{if } \{(x_i, y_i, v_i) \mid t = t_0\} = \emptyset,$$

$$\begin{cases} x_i = x_i(t_0 + \Delta t) \\ y_i = y_i(t_0 + \Delta t) \\ v_i = v_i(t_0 + \Delta t) \end{cases}$$

the moving mean filtering method is used to obtain the smooth vehicle trajectory;

the mean filtering of the trajectory data is as follows:

$$\begin{cases} \overline{x_i(t)} = [x_i(t - \Delta t) + x_i(t) + x_i(t + \Delta t)]/3 \\ \overline{y_i(t)} = [y_i(t - \Delta t) + y_i(t) + y_i(t + \Delta t)]/3 \\ \hat{v}_i = [v_i(t - \Delta t) + v_i(t) + v_i(t + \Delta t)]/3 \end{cases}$$

among them:

$\Delta t$ represents a time interval of recording trajectory data, $\overline{x_i(t)}$, $\overline{y_i(t)}$ represents the position information of vehicle i after filtering, $\hat{v}_i$ represents the speed information of vehicle i after filtering processing.

5. The method for short-term traffic risk prediction of road sections using roadside observation data according to claim 1, the step 3) identifying conflict events with collision risk in the detection area, specifically as follows:

when both the time to collision and deceleration meet threshold requirements, the event is regarded as a conflict event;

$$\text{Event} = \begin{cases} 1, & TTC < ttc \text{ and } Decal < a_{1\%} \\ 0, & \text{else} \end{cases}$$

among them, Event takes 1 to indicate that the event is a conflict event, and Event takes 0 to indicate that the event is a non-conflict event;

TTC and Decel respectively represent the time to collision and deceleration value, ttc represents a critical threshold of the time to collision, $a_{1\%}$ represents 1% quantile of statistical deceleration.

6. The method for short-term traffic risk prediction of road sections using roadside observation data according to claim 1, wherein the step 4) traffic flow indicators and surrogate safety indicators within a set time before occurrence of the identified conflict events are extracted, and classification algorithms are used to perform feature screening on the extracted traffic flow indicators and surrogate safety indicators, comprises:

for the identified conflict events, based on the timestamp, the traffic flow indicators and the surrogate safety indicators within a set time before each conflict event are extracted, and the extracted traffic flow indicators and surrogate safety indicators are aggregated for collision risk prediction modeling, as follows:

the traffic flow indicators and the surrogate safety indicators within a set time before each conflict event occurs are extracted, and the data aggregation method is used to obtain an aggregation value of each indicator;

the data aggregation method is to calculate an average value of a certain indicator of all vehicle targets in the detection area in 1 second, and then aggregate the average value over the set time length;

based on the aggregation values of the traffic flow indicators and surrogate safety indicators, according to contribution of the indicators to collision risk prediction, the random forest classification algorithm is used to sort the indicators by feature importance to complete the screening of feature indicators.

7. The method for short-term traffic risk prediction of road sections using roadside observation data according to claim 6, wherein the data aggregation formula in step 4) is as follows:

$$\text{Indicator} = \left[ \sum_{t}^{t+T} \left( \frac{\sum_{n=1}^{N} p_{t,n}}{N} \right) \right] * \frac{1}{T}$$

among them, Indicator represents a type of aggregated indicators,

T represents a length of time for aggregation, t represents a starting point of data aggregation, N represents a total number of aggregated indicators of a certain type, $p_{t,n}$ represents a nth value of a certain indicator.

8. The method for short-term traffic risk prediction of road sections using roadside observation data according to claim 6, in step 4), the traffic flow indicators and the surrogate safety indicators within a set time before each conflict event are extracted, and the set time is 60 to 120 seconds before the conflict event occurs.

9. The method for short-term traffic risk prediction of road sections using roadside observation data according to claim 1, wherein the construction of a short-term traffic risk prediction model in step 5) is to select the first M feature indicators ranked by importance from screening results as input and then construct the short-term traffic risk prediction model based on support vector machines.

* * * * *